Oct. 7, 1941.　　　B. G. VIGURS　　　2,258,524
COCKTAIL SHAKER
Filed Nov. 18, 1938
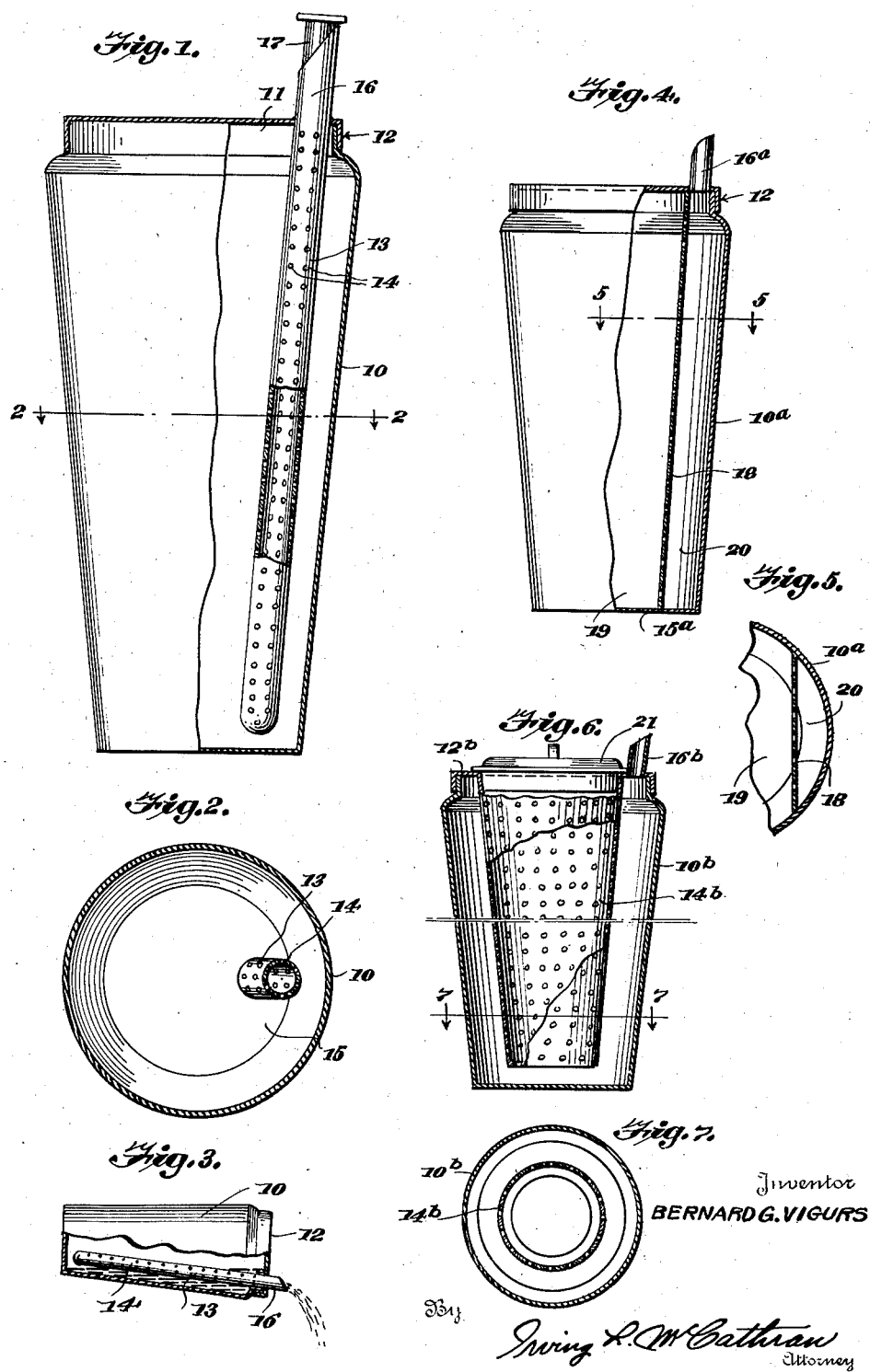
Inventor
BERNARD G. VIGURS
By Irving L. McCathran
Attorney Patented Oct. 7, 1941

2,258,524

UNITED STATES PATENT OFFICE 2,258,524

COCKTAIL SHAKER

Bernard G. Vigurs, Staten Island, N. Y.

Application November 18, 1938, Serial No. 241,271

2 Claims. (Cl. 210—155)

This invention relates to quick-pouring cocktail shakers, and has for one of its objects the production of a simple and efficient means for facilitating the pouring of the contents from a shaker, evenly and steadily, without dribble or splashing.

A further object of this invention is the production of a simple and efficient straining means for a cocktail shaker and the like, wherein the strainer extends for approximately the entire length of the shaker, to provide a maximum straining surface for the contents of the shaker.

Other objects and advantages of this invention will appear throughout the following specification and claims.

In the drawing:

Figure 1 is a side elevational view of a shaker, certain parts being shown in section;

Figure 2 is a horizontal sectional view taken on line 2—2 of Figure 1;

Figure 3 is a side elevational view of the shaker, certain parts being shown in section, and the shaker being shown in a pouring position;

Figure 4 is a side elevational view, partly in section of a modified form of shaker;

Figure 5 is a fragmentary horizontal sectional view taken on line 5—5 of Figure 4;

Figure 6 is a vertical sectional view of a further modified form of the invention;

Figure 7 is a horizontal sectional view taken on line 7—7 of Figure 6.

By referring to the drawing, it will be seen that 10 designates a container preferably in the nature of an elongated tapering cup having a neck 11 over which is adapted to fit a cap 12. This cap 12 carries near its periphery a depending tube 13 in the nature of a strainer, and which, for the purpose of illustration, is perforated as at 14. The tube 13 is suitably perforated to permit the free flow of liquid into the tube from the interior of the container 10, and to prevent the passage of solid or semi-solid pulp and the like, into the tube. This strainer tube 13 is preferably of an elongated type extending from the cap 12 to a point substantially close to the bottom 15 of the container 10. The cap 12 is provided with a projecting pouring spout 16 which constitutes preferably an extension of the strainer tube 13 and a removable plug 17 is adapted to fit into the upper end of the spout 16 to close the same. It will be noted that the strainer tube 13 is adapted to fit close to one side wall of the container 10, as illustrated.

By carefully considering Figure 3, which illustrates the manner in which liquid is poured from the container 10, it will be noted that a quick pouring cocktail shaker is provided which will pour the liquid evenly and steadily without dribble or splash regardless of the amount of orange or lemon pulp, or other interfering matter contained within the container. The perforations 14 within the tube 13 are sufficiently numerous to produce a passage of liquid from the container into the tube at a rate fast enough to cause a steady and even stream of liquid to pour out from the spout 16 even though some of the perforations may become stopped up in the process of pouring. The location of the tube 13 near or close to the side of the container affords a maximum passage or drain from the container as long as any liquid is retained within the container. Furthermore the position of the pouring spout 16, because of its location near the periphery of the cap 12 will facilitate pouring until the entire liquid content of the container has been discharged. Furthermore, the shaker illustrated enables the user to obtain the full benefits of all of the fruit juices in lemons, oranges, and the like, and the pulp of these fruits may be put into the container 10 with other ingredients without fear of spoiling the easy flow of the resulting liquid through the tube 13 and spout 16.

In actual use the cover 12 is removed and the ingredients are placed within the container 10 and the cover is then placed on the container and secured in place. The stopper is then placed within the spout and after the contents of the container, such for instance as a cocktail, is ready to serve, the stopper is removed and the contents may be poured out of the spout 16.

In Figure 4, there is shown a modified form of the invention wherein a container 10a is illustrated, having a cap 12a supporting a spout 16a. A perforated partition 18 is mounted within the container 10a and extends from the cap 12a to the bottom 15a, as shown. This perforated partition 18 constitutes a strainer and divides the container 10a into a pulp-containing compartment 19 and a liquid-containing compartment 20. This perforated partition 18 which constitutes a strainer will strain the contents of the container 10a and cause the free-flowing liquid to pass from the compartment 19 into the compartment 20 which is located along one side of the container 10a and communicates with the pouring spout 16a.

In Figures 6 and 7, I have shown a further modified form of the invention wherein a container 10b is illustrated carrying a cap 12b which supports near one edge a pouring spout 16b. A cone-shaped strainer 14b is suspended centrally from the cap 12b and extends down into the container 10b for approximately its entire length. A lid or cover 21 may be employed to close the upper end of the strainer 14b, as shown. The content of liquid is placed in the strainer 14b and the free-flowing liquid will pass out into the container 10b and may then be poured out through the spout 16b as will be obvious by considering Figure 6.

It will be noted that my invention consists primarily of a perforated extension or area capable of substantial contact with the liquid content of a cocktail shaker, and this construction illustrated and described above will produce a device having great simplicity as well as easy accessibility for cleaning. The feature of the present device which is carried out in the various embodiments is that a maximum perforated contact surface is provided in the strainer in each instance, whereby the free-flowing liquid may pass through the strainer and then freely out through the pouring spout.

It should be understood that certain detail changes in the structure may be employed without departing from the spirit of the invention so long as such changes fall within the scope of the appended claims.

Having described the invention, what is claimed is:

1. A shaker of the class described comprising a container, a removable cap, a pouring spout carried by the cap near the side edge thereof and communicating with the interior of the container, and an elongated strainer carried near one side edge of the cap and removable with the cap and extending into the container for approximately the entire depth thereof and adapted to lie near one side of the container for straining the contents of the container and separating the pulp and other heavy ingredients through the depth of the container from the free-flowing liquid adapted to pass out through the spout, the strainer constituting a continuation of the pouring spout.

2. A shaker of the class described comprising a container, a removable cap, a pouring spout carried by the cap near the side edge thereof and communicating with the interior of the container, an elongated strainer carried near one side edge of the cap and removable with the cap and extending into the container for approximately the entire depth thereof for straining the contents of the container and separating the pulp and other heavy ingredients through the depth of the container from the free-flowing liquid adapted to pass out through the spout, said strainer comprising a perforated tubular member extending into the container to a point in close proximity to the bottom of the container and constituting a part of the cap and also forming a continuation of the spout, the strainer being adapted to lie near the side of the container for straining the contents of the container and separating the pulp and other heavy ingredients throughout the depth of the container from the free-flowing liquid adapted to pass out through the spout, the strainer being adapted to be inserted in the liquid in the container to permit seepage and to receive a quantity of liquid before pouring in a manner whereby the strained liquid in the strainer will be available immediately when the operator moves the container to a pouring position, and the perforations of the strainer extending above the normal liquid level of the container to admit air into the strainer and facilitate flow of the liquid out through the strainer and spout.

BERNARD G. VIGURS.